United States Patent
Edman et al.

(10) Patent No.: US 6,418,604 B1
(45) Date of Patent: Jul. 16, 2002

(54) METHOD OF FABRICATING DIE COATER PARTS

(75) Inventors: Timothy J. Edman, Stillwater; Thomas J. Ludemann, Maplewood; Bernard A. Scheller, Roseville; Robert A. Yapel, Oakdale, all of MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 09/127,474

(22) Filed: Jul. 31, 1998

(51) Int. Cl.$^7$ .............................................. B23Q 17/00
(52) U.S. Cl. ................. 29/407.04; 29/407.05; 33/546; 33/547
(58) Field of Search ................ 29/407.04, 407.05; 118/407, 411, 412; 356/357; 425/461; 73/104, 105; 33/546, 547, 549, 551

(56) References Cited

U.S. PATENT DOCUMENTS

| | | | |
|---|---|---|---|
| 3,508,947 A | | 4/1970 | Hughes |
| 3,804,521 A | * | 4/1974 | Sprague ...................... 356/109 |
| 3,850,526 A | * | 11/1974 | Corey, III .................... 356/109 |
| 4,358,201 A | * | 11/1982 | Makosch ..................... 356/351 |
| 5,145,528 A | * | 9/1992 | Watanabe et al. ........... 118/411 |
| 5,336,322 A | * | 8/1994 | Tobisawa et al. ........... 118/410 |
| 5,484,629 A | * | 1/1996 | Ghosh et al. ................ 427/255 |
| 5,502,566 A | * | 3/1996 | Ai et al. ...................... 356/359 |
| 5,545,256 A | * | 8/1996 | Fukuda et al. .............. 118/410 |
| 5,573,594 A | | 11/1996 | Morikawa et al. |
| 5,587,184 A | | 12/1996 | Leonard et al. |
| 5,624,497 A | * | 4/1997 | Tanaka et al. .............. 118/410 |
| 5,644,948 A | | 7/1997 | Karte et al. |
| 5,655,948 A | * | 8/1997 | Yapel et al. .................. 451/28 |
| 5,679,502 A | * | 10/1997 | Siddons et al. ............. 430/397 |
| 5,851,137 A | | 12/1998 | Bhave et al. |
| 5,852,232 A | * | 12/1998 | Samsavar et al. ............. 73/105 |
| 5,898,181 A | * | 4/1999 | Vurens ................... 250/559.28 |
| 5,909,282 A | * | 6/1999 | Kulawiec ..................... 356/255 |
| 5,955,661 A | * | 9/1999 | Samsavar et al. ............. 73/105 |
| 6,007,874 A | * | 12/1999 | Bhave et al. ................ 427/402 |

FOREIGN PATENT DOCUMENTS

JP        59-047159        3/1984

OTHER PUBLICATIONS

Zygo Corporation, Middlefield, CT, *GPI Growth Potential Interferometer*, No. SB–0282B–796 5M, 1996.
Chippewa Valley Die, Inc., Eau Clair, WI, *Production Components*, brochure.

* cited by examiner

*Primary Examiner*—S. Thomas Hughes
*Assistant Examiner*—Essama Omgba
(74) *Attorney, Agent, or Firm*—Eric D. Levinson

(57) ABSTRACT

A method of preparing a surface on a die coater to improve the uniformity of the coating layer on the substrate. A surface of the die block is machined. The die block is then positioned on a measuring surface in a free state so that the machined surface being measured is substantially vertical. The vertical orientation of the die block substantially removes the effect of gravity on any residual stress during measuring. The steps of machining, positioning, and measuring the die block are repeated until the desired total indicated run-out is achieved. The positioning step may also include interposing at least two point supports between the die block and the measuring surface. In another embodiment, the die blocks are positioned in a reference state or a production state for measuring.

28 Claims, 5 Drawing Sheets

METHOD OF FABRICATING DIE COATER PARTS

FIELD OF THE INVENTION

The present invention relates to a method and apparatus for applying a coating layer onto a substrate, and in particular, to a method of preparing a surface on a die coater to improve the uniformity of the coating layer on the substrate.

BACKGROUND OF THE INVENTION

The production of high quality articles, particularly photographic, photothermographic, and thermographic articles, consists of applying a thin film of a coating solution onto a continuously moving substrate or web. Thin films can be applied using a variety of techniques, including dip coating, forward and reverse roll coating, wire wound rod coating, blade coating, slot coating, slide coating, curtain coating, and extrusion coating. Coatings can be applied as a single layer or as two or more superimposed layers. Although it is usually most convenient for the substrate to be in the form of a continuous web, it may also be formed to a succession of discrete sheets.

Die coating is a process whereby a pressurized stream of the coating material is moved through an internal manifold and discharged from an exit slot to form a ribbon of the coating material. The uniformity of the coating layer depends on the uniformity and precision of the coating slot on the coating dies.

One current method of manufacturing a coating die is to fabricate the die parts, such as by grinding or lapping procedures, and measuring the parts by conventional means. Conventional measuring techniques include laying the die parts on a flat surface, such as a granite table, with the surface being measured perpendicular to gravity. If the part is magnetic, it may even be measured for flatness on the grinder magnetic chuck. Conventional practice teaches that by measuring the die coating parts using this procedure, the best possible coating uniformity can be attained.

FIG. 1 is a schematic illustration of a prior method for measuring a die block 60. The die block 60 is located on a table surface 62 of measuring table 64 so that the machined surface 66 to be measured is perpendicular to gravity G. Gravity will act on the die block 60 in a way to influence the actual measured shape of the machined surface 66. The force of gravity causes the die block 60 to conform to the table surface 62 at an interface 68. Consequently, any residual stress within the die block 60 is distorted. Residual stress refers to a stress system within a solid that is not dependent upon external forces, such as gravity or a retaining fixture. Additionally, non-uniformity of the table surface 62 may be transmitted through the die block 60. The measured total indicated run-out of the machined surface 66 will not reflect the actual total indicated run-out when the die block 60 is in the production state. Production state refers to the orientation of the die block when mounted in the die assembly or a fixture simulating the die assembly.

In an attempt to improve coating uniformity, various manual, mechanical, thermomechanical, piezomechanical, magnetostrictive, and motor driven actuators have been installed on coating dies to control the die slot. The actuators can be located to generate an individual displacement force locally across the width of the slot exit. Since at any point across the die width the local discharge rate from the slot exit depends on the local gap, the uniformity of the flow rate from the die can be controlled across the width. U.S. Pat. No. 5,587,184 discloses a coating die with a slot thickness control mechanism located away from the slot exit.

Control of the die slot is typically accomplished by measuring the thickness of the film or coating at various points across its width with a thickness gauge such as a beta-ray, x-ray, or light absorption gauge. With the information from such measurements, an operator can manually adjust a bolt-type actuator bearing against the coating die. Alternatively, a control system can signal the activation of actuators which bear against the coating die or which rotate bolts that bear against the coating die. The manual adjustment of the coating die flexing bolts by an operator requires skill and experience. It has been shown that the quality of the product extruded or coated can be improved by a closed loop control system to replace the manual operator adjustment.

The die slot is typically not set for optimum uniformity when initially assembled. The adjustment cycle is time consuming and typically results in significant waste of coating material and substrate. Moreover, the actuators are not truly independent, but interact. That is, an adjustment of one actuator can require an adjustment of adjacent actuators. Consequently, the cross-web mechanical resolution, coupled with the limitations discussed above, results in inadequate accuracy of the die slot.

SUMMARY OF THE INVENTION

The present invention is directed to a method of improving the slot uniformity, and thus the coating uniformity, by accounting for forces acting on the die blocks that deflect their shape. These forces especially include the residual stress in the die block and gravity. Gravity can mask the effect of residual stress in the measurement of the die blocks when conventional measuring techniques are used. When the die block is mounted in the die assembly, the residual stress causes the total indicated run-out of the slot to be larger than anticipated and the slot to be distorted. Consequently, coating uniformity is degraded.

In the method of the present invention, the die blocks are measured in a free state whereby the residual stress is apparent. Subsequent machining can then be adjusted to compensate for the distortion due to residual stress, and a desired total indicated run-out achieved. The present invention is applicable to a variety of die coaters, including slide coaters, curtain coaters, extrusion coaters and slot coaters.

In a first embodiment, a surface of the die block is machined. The die block is then positioned on a measuring surface in a free state so that the machined surface being measured is substantially vertical. The vertical orientation of the die block substantially removes the effect of gravity on any residual stress during measuring. The steps of machining, positioning, and measuring the die block are repeated until the desired total indicated run-out is achieved. In an alternate embodiment, the positioning step may include interposing at least two point supports between the die block and the measuring surface.

In a second embodiment, the die block is machined and then positioned on a measuring surface so that the machined surface is in a reference state. Reference state refers to an orientation that simulates the production orientation of the die block during coating. The machined surface is measured and the steps of machining, positioning and measuring are repeated until a desired total indicated run-out is achieved.

In a third embodiment, the die block is machined and then positioned in a fixture that produces a simulated production state. The fixture includes fasteners corresponding to the fasteners used to assemble the die blocks for coating. The fasteners on the fixture generate forces that simulate the forces on the die block encountered in the die assembly during coating. The die block mounted in the simulated production state is measured for total indicated run-out. Machining, positioning, and measuring steps are repeated until a desired total indicated run-out is achieved.

The step of measuring is preferably performed using a non-contact measuring system, such as a laser interferometer. The surface being measured may be a slot wall or an alignment surface. In some embodiments, the die blocks have two or more surfaces prepared in accordance to the present invention.

The present method also includes assembling the die blocks prepared in accordance with the present invention, providing a flow of coating liquid to a manifold fluidly coupled to the die slot, and applying the coating liquid to a substrate.

DETAILED DESCRIPTION OF THE INVENTION

Figure 2:
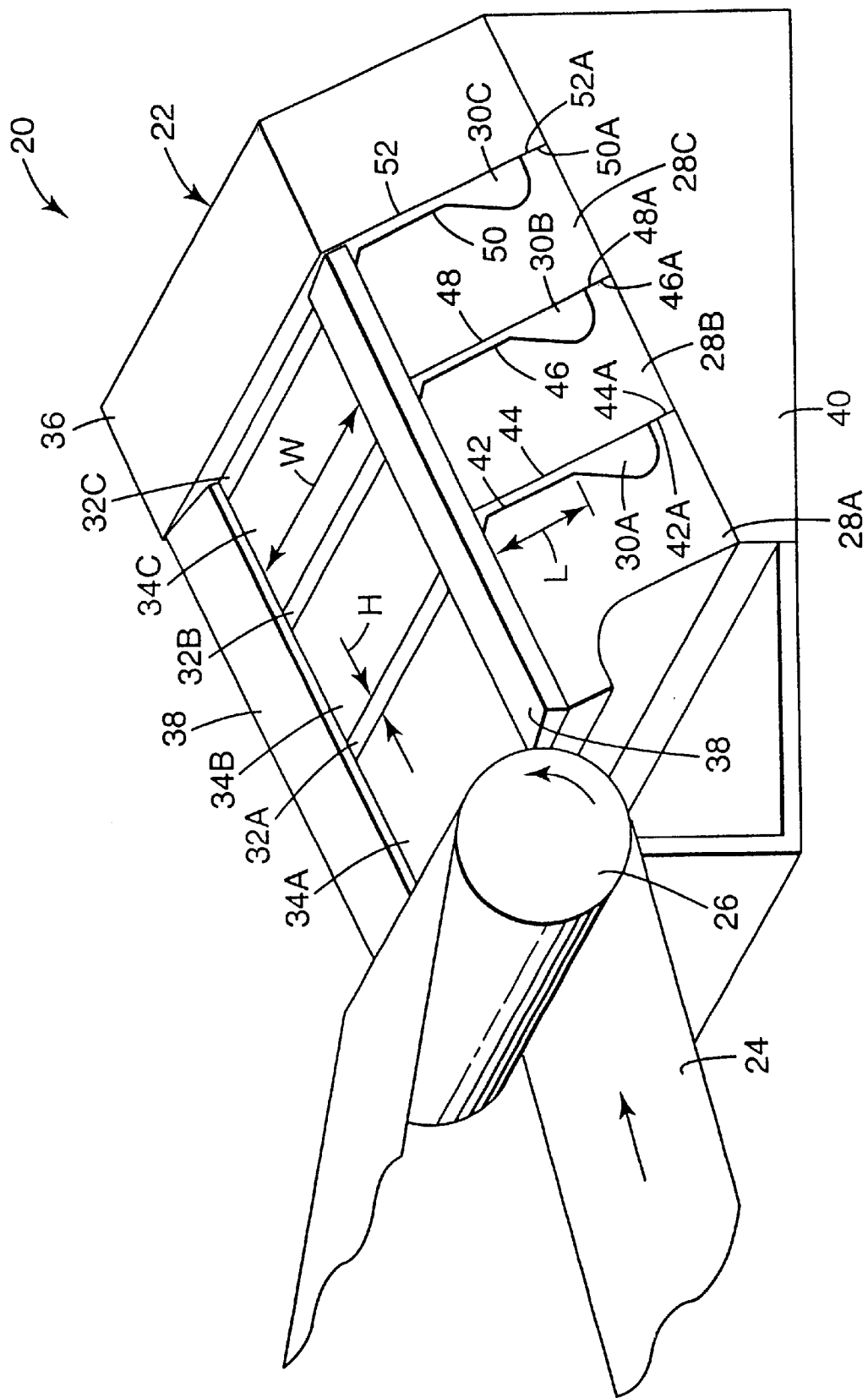
FIG. 2 illustrates an exemplary slide coater manufactured in accordance with the present invention.

FIG. 2 is a perspective view of a slide coater 20 made according to the method of the present invention. The slide coater 20 includes a die assembly 22 positioned opposite a running web 24 that is supported by a backup roll 26. The die assembly 22 supported by base plate 40 includes a series of die blocks 28A, 28B, 28C, each configured with a manifold 30A, 30B, 30C that is fluidly coupled to a series of die slots 32A, 32B, 32C, respectively. Coating material supplied to the manifolds 30A, 30B, 30C is extruded from the slots 32A, 32B, 32C and slides down the slide surfaces 34A, 34B, 34C to be coated onto the running web 24.

The die slot 32A is formed by the surface 42 on the die block 28A and the surface 44 on the die block 28B. Slot height "H" is the narrow dimension of the slot 32A between the two parallel surfaces 42 and 44. The slot length "L" corresponds to the distance from the manifold 30A to the slide surface 34A. The slot width "W" corresponds to the coated width. The coated width is determined by edge guides 38. Alignment surface 42A on the die block 28A is configured to engage with a corresponding alignment surface 44A on the die block 28B. Surfaces 42 and 42A are usually parallel so that the slot 32A has a uniform height "H" with respect to the surface 44. In some embodiments, the surfaces 44 and 44A may be a single continuous surface.

The die slot 32B is formed by the surface 46 on the die block 28B and the surface 48 on the die block 28C. Slot height "H" is the gap between the two parallel surfaces 46 and 48. The slot length "L" corresponds to the distance from the manifold 30B to the slide surface 34B. The slot width "W" is determined by edge guides 38. Alignment surface 46A on the die block 28B is configured to engage with a corresponding alignment surface 48A on the die block 28C. Surfaces 46 and 46A are usually parallel so that the slot 32B has a uniform height "H" with respect to the surface 48.

The die slot 32C is formed by the surface 50 on the die block 28C and the surface 52 on upstream block 36. Slot height "H" is defined by the gap between the two parallel surfaces 50 and 52. The slot length "L" corresponds to the distance from the manifold 30C to the slide surface 34C. Alignment surface 50A on the die block 28C is configured to engage with a corresponding alignment surface 52A on the upstream block 36. Surfaces 50 and 50A are usually parallel so that the slot 32C has a uniform height "H" with respect to the surface 52.

A fundamental problem with all die assemblies, such as the die assembly 22, is the ability to accomplish a uniform flow per unit area across the width "W" of the die assembly 22. An important criteria for attaining uniformity of flow, and thus a critical uniformity of the coating, is the ability to construct the die blocks 28A, 28B, 28C, 36 with a uniform die height "H".

The relationship between flow in the slots 32A, 32B, 32C and the slot geometry for a power law fluid is given by the equation $$Q/W = \frac{nB^2}{2(1+2n)}(BP/2KL)^{1/n}$$

where Q/W is the flow per unit width, B is the slot height, P is the pressure, L is the slot length, and n is the power law index. For Newtonian constant viscosity fluids n=1.

In the die assembly 22 illustrated in FIG. 2, the uniformity of die slot height "H" is dependent on the total indicated run-out ("TIR") or flatness of slot surfaces 42, 44, 46, 48, 50, 52 and the alignment surfaces 42A, 44A, 46A, 48A, 50A and 52A. If each of the slot walls 42, 44, 46, 48, 50, 52 has a total indicated run-out of t, then the percent uniformity of flow from the slots 32A, 32B, 32C is equal to $$\%\text{Uniformity} = \frac{100[(B+t)^{(2+1/n)} - (B-t)^{(2+1/n)}]}{B^{(2+1/n)}}$$

where B and n are as defined above.

Figure 1:
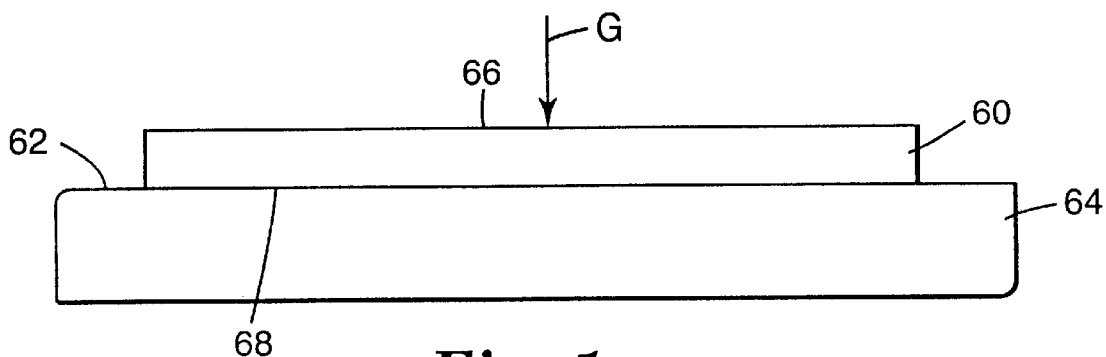
FIG. 1 is a schematic illustration of a prior method of measuring a die block.
Figure 3:
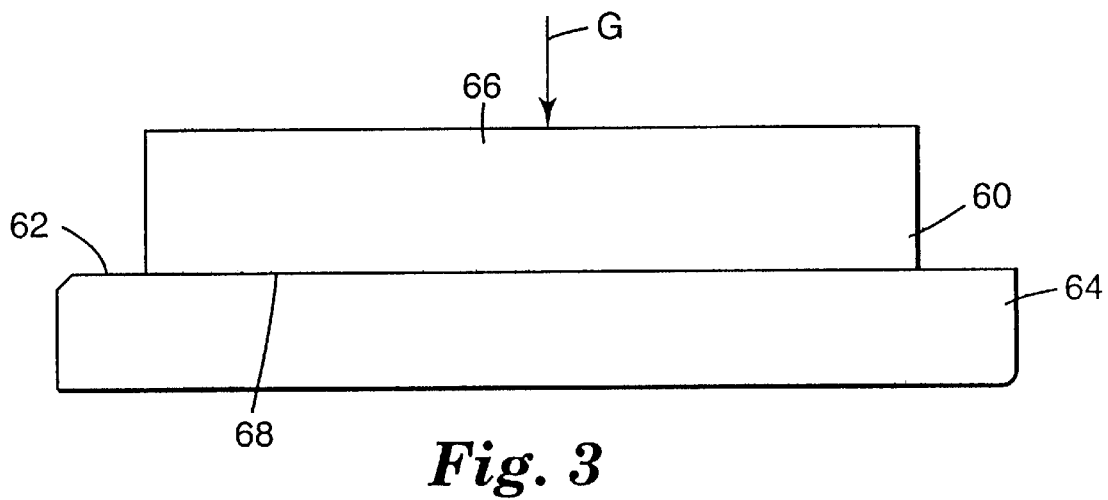
FIG. 3 is a schematic illustration of a method of measuring a die block in accordance with the present method.

FIG. 3 illustrates a first embodiment of the present method in which the die block 60 is located on the table surface 62. In FIG. 3, the die block 60 has been rotated 90 degrees so that the machined surface 66 to be measured is substantially parallel to the force of gravity G. The die block 60 is measured with the die face vertical (i.e., parallel to the force of gravity) so that gravity does not influence the measured shape of the machined surface 66 and otherwise mask the effect of residual stress.

In the method illustrated in FIG. 3, the die block 60 is in a substantially free state. Free state refers to an orientation that permits the effect of residual stress to be apparent and that minimizes the gravitational forces working against the surface being measured. Consequently, residual stress within the die block 60 is exhibited on the machined surface 66 during the measuring process. The die block 60 may be machined to compensate for the total indicated run-out measured using the method illustrated in FIG. 3. Machining refers to grinding, lapping, milling, or otherwise planarizing of the machined surface 66. The machined surface 66 may be measured using a variety of techniques, such as with a laser interferometer available from Zygo Corporation of Middlefield, Conn. The steps of machining, positioning and measuring can be and are typically repeated until the desired TIR is achieved or satisfactorily approached.

It is recognized by the inventors that steps other than machining the surface 66 of the die block 60, as "machining" is referred to herein, could be used to modify the surface 66 to achieve or more closely approach the desired total indicated run-out (or a similar surface attribute). For example, other methods of removing material from the surface 66 can be used, such as laser-cutting when the surface 66 is susceptible to such a step. Also, rather than machining or another "removing" step, the surface 66 could be modified by adding a material to the surface 66 to approach or achieve the desired effect, for example a hardenable fluid could be applied (e.g., coated) to the surface 66 which hardens and attaches to the surface; or, another material could be applied which is treated in some manner (e.g., heat-treated, UV-cured, E-beam cured, etc.) to attach the material to the surface 66. Still other steps for modifying the surface 66 are contemplated for providing the desired total indicated run-out or a similar surface attribute.

Figure 4:
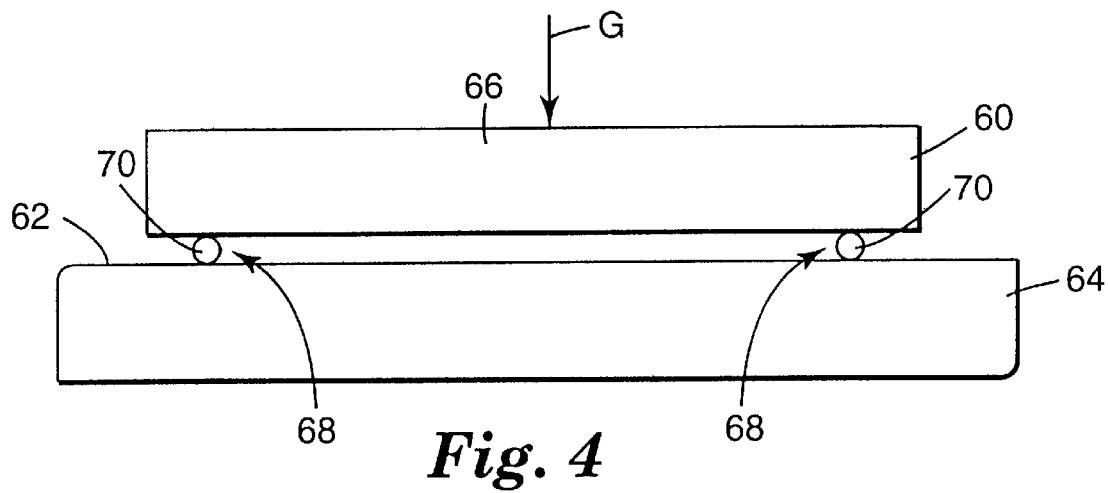
FIG. 4 is a schematic illustration of an alternate method of measuring a die block in accordance with the present invention.

FIG. 4 is a schematic illustration of an alternate method in accordance with the present invention in which the die block 60 is supported in a free state on at least two point supports 70. The point supports 70 reduce the contact between die block 60 and the table surface 62 so that any residual stresses is exhibited on the machined surface 66.

Figure 5:
FIG. 5 is a schematic illustration of an extrusion coating die manufactured in accordance with the present invention.
Figure 6:
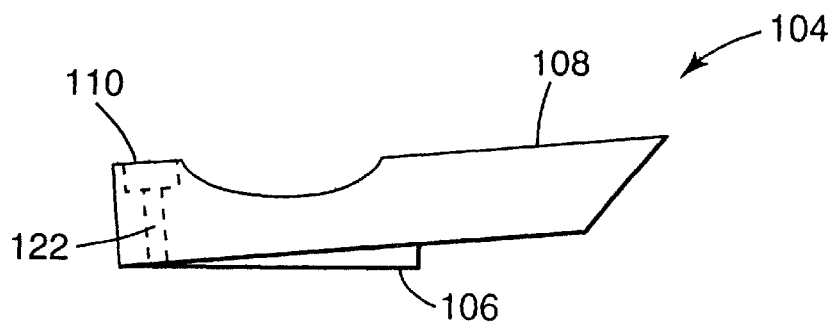
FIG. 6 is a schematic illustration of the lower die block of FIG. 5 positioned in either a reference state or simulated production state.
Figure 7:
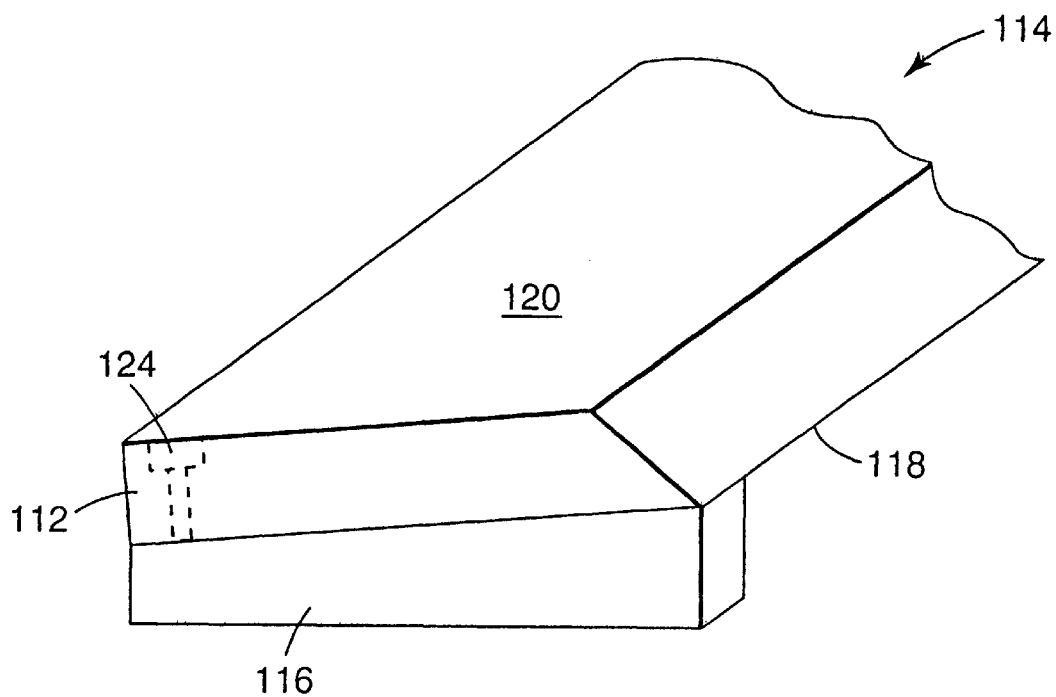
FIG. 7 is a perspective view of the upper die block of FIG. 5 positioned in either a reference state or a production state.

FIGS. 5 through 7 illustrate application of the present method to a slot or extrusion die 100. In one embodiment, the bottom die block 102 is maintained in a reference state 104 by a support 106. Reference state refers to an orientation that simulates the production state of a die block when assembled for coating, such that the influence of gravity on the die block during coating can be accounted for in die fabrication. The slot surface 108 and alignment surface 110 are measured while the bottom die block 102 is in the reference state. Similarly, the top die block 112 is maintained in the reference state 114 by a support 116 so that the surface 118 and optionally surface 120 can be measured as discussed above. The surface 120 serves as a reference surface in a duel extrusion die.

In an alternate embodiment, the supports 106, 116 are fixtures that produce a simulated production state. The simulated production state refers to the orientation and shape of the die block when mounted in a fixture that simulates the die assembly. Fasteners 122, 124 are used to mount the die blocks 102, 112 to their respective fixtures 106, 116 to simulate the deflection of the die blocks 102, 112 when in the die assembly (see e.g., FIG. 2). The surfaces 108, 110, 118, 120 are then measured. The die blocks 102, 112 can subsequently be removed from their respective fixtures 106, 116 and machined to reduce the total indicated run-out.

Figure 8:
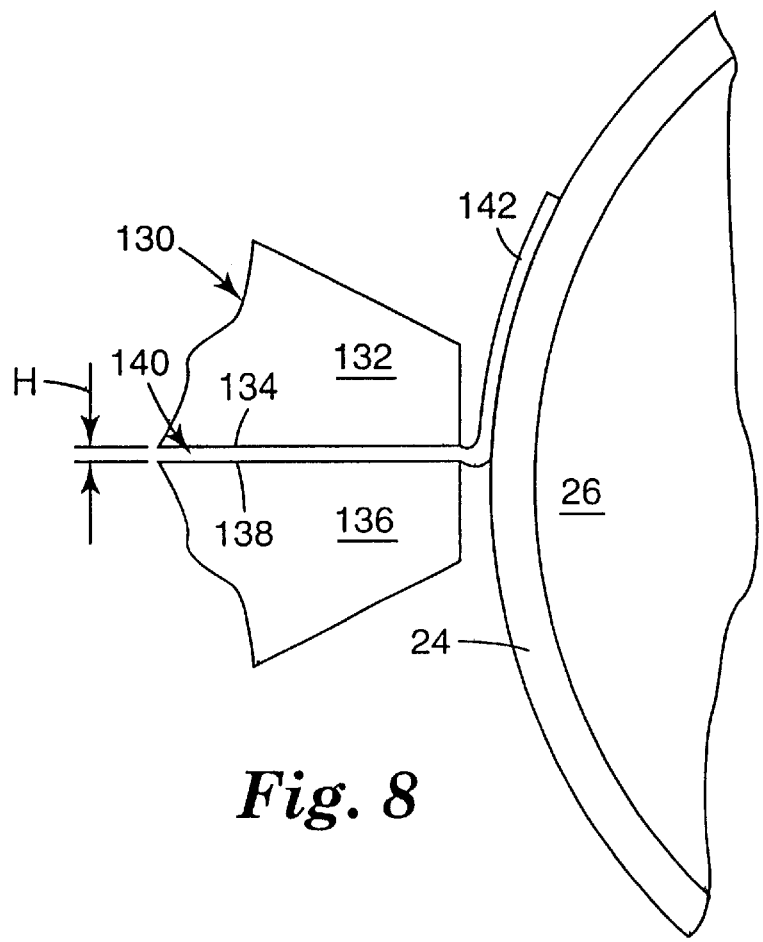
FIG. 8 is a side sectional view of an extrusion die manufactured in accordance with the present invention.

FIG. 8 is a side sectional view of a slot or extrusion die 130 manufactured in accordance with the present invention. The extrusion die 130 is positioned opposite a running web 24 that is supported by a backup roll 26. The extrusion die 130 includes upper die block 132 having a surface 134 and lower die block 136 having a surface 138. The surfaces 134, 138 define a die slot 140. Slot height "H" is the narrow dimension of the slot 140 between the two parallel surfaces 134 and 138. The surfaces 134, 138 are prepared in accordance with the present invention prior to the extrusion die 130 being assembled. Coating material 142 is extruded from the die slot 140 and coated onto the running web 24.

Figure 9:
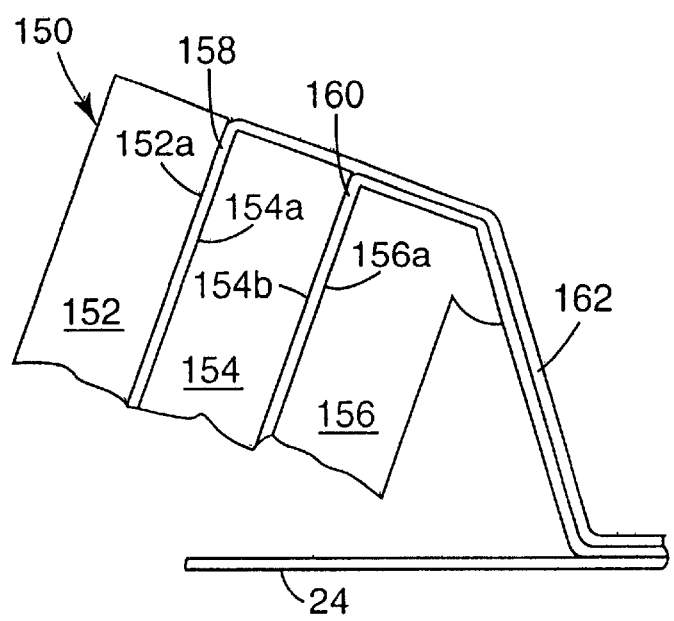
FIG. 9 is a side sectional view of a curtain coating die manufactured in accordance with the present invention.

FIG. 9 is a side sectional view of a curtain coating die 150 manufactured in accordance with the present invention. The curtain coating die 150 is positioned above the running web 24. The curtain coating die 150 includes a series of die blocks 152, 154, 156 defining die slots 158, 160, similar to the configuration illustrated in FIG. 2. The surfaces 152a, 154a define the die slot 158. The surfaces 154b, 156a define the die slot 160. The surfaces 152a, 154a, 154b, 156a are prepared in accordance with the present invention prior to the curtain coating die 150 being assembled. Coating material 162 is extruded from the die slots 158, 160 and curtain coated onto the running web 24.

EXAMPLE

Coater die blocks for a slide coater such as illustrated in FIG. 2 were fabricated by the conventional method of fabrication and measurement. The die blocks were 153.7 centimeters (60.5 inches) long and 17 centimeters (6.7 inches) tall, with a slot length of 142.2 centimeters (56 inches). Each of the die blocks included alignment surfaces, such as surfaces 42A, 46A, 52A of FIG. 2, of about 7.9 millimeters (0.31 inches) in length. The die blocks were constructed from 15-5 PH SSTL steel, heat treated at 552° C. (1025° F.) for 4 hours and air cooled to condition the surfaces that form the slot height. The die blocks had an average Rockwell "C" hardness of 38.

All of the blocks were measured to have a total indicated run-out of less than 0.0025 millimeters (0.0001 inches). The uniformity of the slots were measured by a capacitance type gauge, available from Capacitec Corp. of Ayer, Mass., with the blocks assembled with uniform bolt torque. The blocks were at an angle of 25 degrees from horizontal when assembled with a nominal slot height of 0.56 millimeters (0.022 inches). The total indicated run-out of the coating slot was measured at about 0.051 millimeters (0.0002 inches) at 5.5 kg-meters (40 foot pounds) of bolt torque. Later, the die blocks were disassembled and measured in the reference state of FIG. 4 using a laser interferometer available from Zygo Corporation of Middlefield, Conn. It was discovered that the vertical/free state of the die blocks had a total indicated run-out of about 0.013 millimeters to about 0.064 millimeters (about 500 to about 2500 millionths of an inch).

The bars were then reground and measured in the reference state illustrated in FIG. 4. The total indicated run-out (TIR) of the surfaces was reduced to less than 0.0038 millimeters (0.000150 inches). The TIR of the coater slots upon re-assembly was reduced to 0.0028 millimeters (0.000110 inches) at 5.5 kg-meter (40 ft-lb.) bolt torque.

Figure 10:
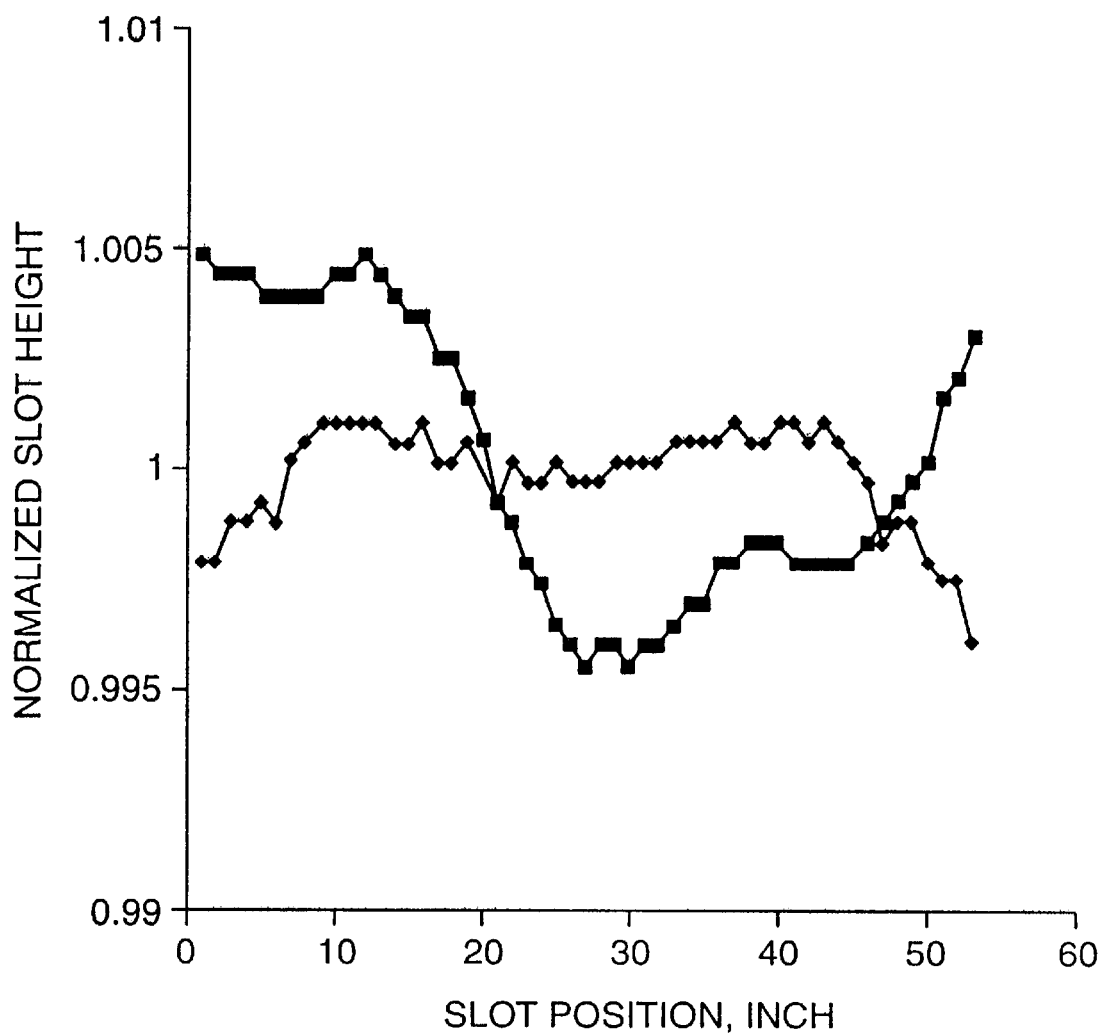
FIG. 10 is a graphical illustration comparing slot uniformity achieved using a prior technique and the method of the present invention.

The normalized slot height for the prior manufacturing and measuring technique and the claimed method across the width of the die block are shown graphically in FIG. 10. Normalized slot height refers to slot height divided by average slot height. FIG. 10 shows a significantly more uniform slot height, especially between 25.4 centimeters (10 inches) to about 127 centimeters (50 inches) along the die block width.

The complete disclosures of all patents, patent applications, and publications are incorporated herein by reference as if individually incorporated. Various modifications and alterations of this invention will become apparent to those skilled in the art without departing from the scope and spirit of this invention, and it should be understood that this invention is not to be unduly limited to the illustrative embodiments set forth herein.

What is claimed is:

1. A method of preparing a die slot in a die coater, wherein the die coater has a die block having a surface, and wherein the surface has a total indicated run-out that affects uniformity of flow volume of a coating liquid across the die slot, comprising the steps of:

machining the surface;

positioning the die block on a measuring surface in a free state so that the machined surface is substantially vertical;

measuring the total indicated run-out of the machined surface while the die block is in the free state;

repeating the machining, positioning and measuring steps until a desired total indicated run-out is achieved; and assembling the die block into the die coater.

2. The method of claim 1 wherein the step of measuring comprises using a non-contact measuring system.

3. The method of claim 1 wherein the step of positioning comprises interposing at least two point supports between the die block and the measuring surface.

4. The method of claim 1 wherein the surface comprises one of a slot wall or an alignment surface.

5. The method of claim 1 wherein the die coater is one of a slot coater, a curtain coater, and extrusion coater or a slide coater.

6. The method of claim 1 further comprising the steps of:

providing a flow of the coating liquid to a manifold fluidly coupled to the die slot; and applying the coating liquid to a substrate.

7. A method of preparing a die slot in a die coater having a die block having a first surface, wherein the first surface has a total indicated run-out that affects uniformity of flow volume of a coating liquid across the die slot, the method comprising the steps of:

positioning the die block on a measuring surface in a free state so that the first surface is substantially vertical;

measuring the total indicated run-out of the first surface while the die block is in the free state;

modifying the first surface such that the first surface has or more closely approaches a desired total indicated run-out;

repeating one or more of the positioning, measuring, and modifying steps as desired to achieve or satisfactorily approach the desired total indicated run-out; and assembling the die block into the die coater.

8. A method for preparing a first member of a die coater, wherein the first die member has a first surface having a run-out that affects uniformity of flow volume of a coating liquid across a die slot of the die coater, wherein the method comprises the steps of:

machining the first surface;

positioning the first die member such that the first surface is substantially vertical; and measuring the run-out of the first surface when the first surface is substantially vertical.

9. The method of claim 8, wherein the first surface is substantial horizontal during the step of machining the first surface.

10. The method of claim 8, wherein the positioning step occurs before the measuring step begins and after the machining step begins, wherein the machining step reduces the run-out of the first surface, wherein the method further comprises the step of, after the step of measuring the run-out of the first surface, modifying the first surface, wherein the step of modifying the first surface reduces the run-out of the first surface when measured with the first surface being substantially vertical.

11. The method of claim 8, further comprising the step of effectively rotating the first die member approximately ninety degrees between the step of machining the first surface and the step of measuring the run-out of the first surface.

12. The method of claim 8, wherein the first die member has a first slide surface over which coating liquid flows when the die coater is operated, wherein the first slide surface is positioned relative to the first surface such that the first slide surface is not vertical when the first surface is substantially vertical.

13. The method of claim 8 further comprising the step of modifying the first surface based on the step of measuring the run-out of the first surface.

14. The method of claim 8 further comprising the steps of:

assembling the first die member with a second die member of the die coater; and after the step of assembling the first die member with the second die member, flowing the coating liquid through the die slot and onto a substrate.

15. The method of claim 14, wherein the first surface is not horizontal during the flowing step.

16. The method of claim 14, wherein the first surface is substantially horizontal during the flowing step.

17. The method of claim 8, wherein the first die member comprises a first die block and a second die member of the die coater comprises a second die block having a second surface, wherein the die slot has a die height defined by the first and second surfaces when the first die block is assembled with the second die block.

18. The method of claim 8, wherein a second die member of the die coater has a second surface having a run-out that affects the uniformity of flow volume across the die slot, the method further comprising the steps of:

machining the second surface;

positioning the second die member such that the second surface is substantially vertical; and measuring the run-out of the second surface when the second surface is substantially vertical.

19. The method of claim 18, further comprising the steps of:

based on the step of measuring run-out of the first surface, modifying the first surface, wherein the step of modifying the first surface reduces the run-out of the first surface when measured with the first surface being substantially vertical; and based on the step of measuring the run-out of the second surface, modifying the second surface, wherein the step of modifying the second surface reduces the run-out of the second surface when measured with the second surface being substantially vertical.

20. The method of claim 18, further comprising the steps of:

effectively rotating the first die member approximately ninety degrees between the step of machining the first surface and the step of measuring the run-out of the first surface; and effectively rotating the second die member approximately ninety degrees between the step of machining the second surface and the step of measuring the run-out of the second surface.

21. The method of claim 18, wherein at least one of the steps of measuring the run-out of the first surface and measuring the run-out of the second surface comprises using a non-contact measuring system.

22. The method of claim 18, wherein the step of positioning the first die member occurs before the step of measuring the first surface begins and after the step of machining the first surface begins, wherein the step of positioning the second die member occurs before the step of measuring the second surface begins and after the step of machining the second surface begins, wherein the steps of machining the first and second surfaces reduce the run-out of the first and second surfaces, respectively, and wherein the die coater is one of a slot die coater, a slide coater, a curtain coater, and an extrusion coater.

23. The method of claim 18, wherein the step of machining the first surface comprises grinding the first surface, and wherein the step of machining the second surface comprises grinding the second surface.

24. A method for preparing first and second die members of a die coater, wherein the first die member has a first surface and the second die member has a second surface, wherein the first and second surfaces each has a run-out that affects uniformity of flow volume of a coating liquid across a die slot of the die coater, wherein the method comprises the steps of:

machining the first surface;

positioning the first die member such that the first surface is substantially vertical;

measuring the run-out of the first surface when the first surface is substantially vertical;

based on the step of measuring the run-out of the first surface, modifying the first surface, wherein the step of modifying the first surface reduces run-out of the first surface when measured with the first surface being substantially vertical;

machining the second surface;

positioning the second die member such that the second surface is substantially vertical;

measuring the run-out of the second surface when the second surface is substantially vertical; and based on the step of measuring run-out of the second surface, modifying the second surface, wherein the step of modifying the second surface reduces the run-out of the second surface when measured with the second surface being substantially vertical.

25. The method of claim 24 further comprising the steps of:

assembling the first die member with the second die member; and after the assembling step, flowing the coating liquid through the die slot and onto a substrate.

26. The method of claim 24, wherein the step of positioning the first die member occurs before the step of measuring of the first surface begins and after the step of machining the first surface begins, wherein the step of positioning the second die member occurs before the step of measuring of the second surface begins and after the step of machining the second surface begins, wherein the steps of machining the first and second surfaces reduce the run-out of the first and second surfaces, respectively, wherein the die slot has a die slot height defined by the first and second surfaces when the first die member is assembled with the second die member.

27. The method of claim 24, wherein the first die member is effectively rotated approximately ninety degrees between the step of machining the first surface and the step of measuring the run-out of the first surface, and wherein the second die member is effectively rotated approximately ninety degrees between the step of machining the second surface and the step of measuring run-out of the second surface.

28. The method of claim 24, wherein the first die member has a first slide surface over which coating liquid flows when the die coater is operated, wherein the first slide surface is positioned relative to the first surface such that the first slide surface is not substantially vertical when the first surface is substantially vertical, wherein the second die member has a second slide surface over which coating liquid flows when the die coater is operated, wherein the second slide surface is positioned relative to the second surface such that the second slide surface is not substantially vertical when the second die member is substantially vertical.

* * * * *